US007788475B2

(12) United States Patent
Zimmer et al.

(10) Patent No.: US 7,788,475 B2
(45) Date of Patent: Aug. 31, 2010

(54) BOOTING UTILIZING ELECTRONIC MAIL

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 559 days.

(21) Appl. No.: 11/648,007

(22) Filed: Dec. 28, 2006

(65) Prior Publication Data
US 2008/0162919 A1 Jul. 3, 2008

(51) Int. Cl.
G06F 9/00 (2006.01)
G06F 9/24 (2006.01)
G06F 15/177 (2006.01)

(52) U.S. Cl. ......................................................... 713/1
(58) Field of Classification Search ...................... 713/1, 713/2; 709/204–207
See application file for complete search history.

(56) References Cited

U.S. PATENT DOCUMENTS

| | | | |
|---|---|---|---|
| 6,430,707 B1 * | 8/2002 | Matthews et al. ............. 714/37 |
| 6,826,710 B2 * | 11/2004 | Merkin et al. ................. 714/6 |
| 7,281,068 B2 * | 10/2007 | Davis et al. ................... 710/62 |
| 2003/0126426 A1 * | 7/2003 | Frye, Jr. .......................... 713/2 |
| 2005/0149729 A1 * | 7/2005 | Zimmer et al. .............. 713/168 |
| 2005/0283606 A1 * | 12/2005 | Williams ..................... 713/166 |
| 2008/0155245 A1 * | 6/2008 | Lipscombe et al. ............ 713/2 |

OTHER PUBLICATIONS

Preboo Execution Environment (PXE) Specification Sep. 20, 1999, Intel Corp, 2.1.*
ClientHostname.info Jan. 1, 1999, IBM.*
"HTTP booting" Mar. 23, 2004, etherboo.org.*

* cited by examiner

Primary Examiner—Thomas Lee
Assistant Examiner—Mohammed H Rehman
(74) Attorney, Agent, or Firm—Schwabe, Williamson & Wyatt, P.C.

(57) ABSTRACT

The present disclosure relates to a technique for starting (or restarting) a computer system and loading the operating system, and specifically to starting (or restarting) a computer system and loading the operating system utilizing an electronic mail or messaging protocol.

21 Claims, 2 Drawing Sheets

BOOTING UTILIZING ELECTRONIC MAIL

BACKGROUND

1. Field

The present disclosure relates to a technique for starting (or restarting) a computer system and loading the operating system, and specifically to starting (or restarting) a computer system and loading the operating system utilizing an electronic mail or messaging protocol.

2. Background Information

Currently, a computer system is booted, that is, started (or restarted) a computer system and loading the operating system, by loading a boot image. Often the boot image is loaded from a local media, such as, for example, a hard drive, optical storage (e.g. CD-ROM, DVD-ROM, etc.), a flash memory (e.g. a pen drive), a floppy drive, etc. Occasionally, the boot image may also be loaded in whole or part via a network connection. In some instances this may involve the use of the PreBoot Execution Environment (PXE), which is described in the specification (v2.1) published by Intel and Systemsoft on Sep. 20, 1999, or a substantially equivalent implementation of either the specification, the specification's predecessors, or derivatives of the specification.

In this context, a boot image may be a computer file or files containing the complete or the partial contents and structure of a computer storage media. When it is transferred on a boot device it may allow the associated hardware to boot. A boot image usually, but not always, includes the operating system, utilities and diagnostics, as well as boot and data recovery information. It also may includes those "applications" used organization-wide. A specialized image for a particular type of user or department is called typically a departmental boot image. Building such an image can take days or weeks, and involve complex decisions about licensing and permissions—including which passwords to store in the boot image and which to require users to type in—and requires experts in software integration to do. However, once built, the boot image can often be simply copied onto devices, patched within reasonable limits, and remains disposable in case of any problems (viruses in particular).

Current network booting, specifically for example the PXE requires Dynamic Host Configuration Protocol (DHCP) with special option tags and Trivial File Transfer Protocol (TFTP). The DHCP is a set of rules used by a communications device (such as a computer, router or networking adapter) to allow the device to request and obtain an Internet address from a server which has a list of addresses available for assignment. Trivial File Transfer Protocol (TFTP) is a very simple file transfer protocol, with the functionality of a very basic form of File Transfer Protocol (FTP); it was first defined in 1980. Unfortunately, both the option tags and TFTP are routinely blocked by many of today's routers or firewalls.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

Figure 1:
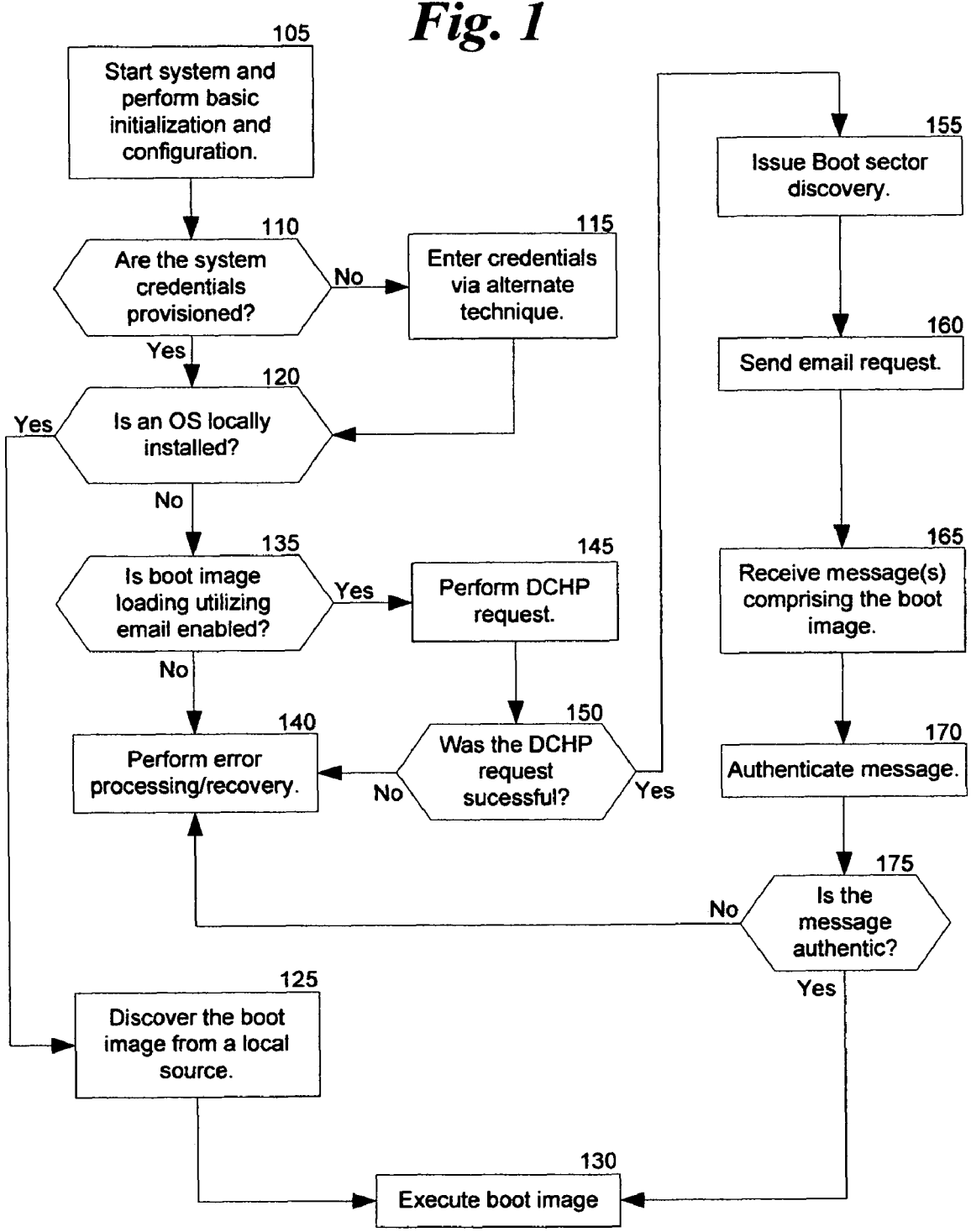
FIG. 1 is a flowchart illustrating an embodiment of a technique for starting (or restarting) a computer system in accordance with the claimed subject matter.

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

In the following detailed description, reference is made to the accompanying drawings which form a part hereof, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element. And, so forth.

For ease of understanding, the description will be in large part presented in the context of commodity networking; however, the present invention is not so limited, and may be practiced to provide more relevant answers to a variety of queries. Reference in the specification to a network "device" and/or "appliance" means that a particular feature, structure, or characteristic, namely device operable connectivity, such as the ability for the device to be connected to communicate across the network, and/or programmability, such as the ability for the device to be configured to perform designated functions, is included in at least one embodiment of the digital device as used herein. Typically, digital devices may include general and/or special purpose computing devices, connected personal computers, network printers, network attached storage devices, voice over internet protocol devices, security cameras, baby cameras, media adapters, entertainment personal computers, and/or other networked devices suitably configured for practicing the present invention in accordance with at least one embodiment.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

As described above, it is often desirable for an organization to use a common, or set of boot images for a number of computer systems. Unfortunately, these boot images must be either loaded directly onto a local media storage (such as, for example, a hard rive or other form of storage) or copied over a network. As described above, systems using PXE may be blocked from pulling a boot image across the network by an unfriendly or improperly configured router or firewall, as the firewall is likely to block the needed option tags and TFTP.

In one embodiment, these and possibly other difficulties may be overcome by utilizing an email or messaging protocol to transmit a boot image across a network. In one highly specific embodiment, such a system may be use in the setting of an Internet Café (iCafe). In this embodiment, the computer systems may contain a firmware substantially compliant with the Extensible Firmware Interface (EFI) or its derivatives, such as, for example the Unified EFI (UEFI); however, it is understood this is merely one embodiments and the disclosed subject matter is not limited to any particular firmware. The UEFI Forum released version 2.0 of the UEFI specification on Jan. 31, 2006.

In this specific embodiment, to which the disclosed subject matter is not limited, the boot image may be transmitted over the network via a messaging protocol, such as for example, email. While this document may refer to the use of email as a shorthand, it is understood that this is merely one embodiment of the disclosed subject matter and any messaging protocol may be used, such as for example am Instant Messaging (IM) or Short Message Service (SMS) protocol may be used, and is contemplated.

In this specific embodiment, to which the disclosed subject matter is not limited, the boot image may be transmitted over the network via a messaging protocol, such as for example, email. For example, the booting computer system may contact a centralized boot image server and request that a boot image be transmitted to it via email. In some embodiments, a protocol substantially complaint with the Simple Mail Transfer Protocol (SMTP) may be used. Whereas, in other embodiments, Post Office Protocol (POP, or often POP3) or Internet Message Access Protocol (commonly known as IMAP or IMAP4) may be utilized. In one embodiment, a number of iCafes may be operated in different locations by the same or different companies or franchisees, and the boot image for each computer be transmitted from a distant server. In another embodiment, the boot image server may be located locally. In various embodiments, the firmware may be operated by the franchisor, owner business entity, or a third party.

In other embodiments, this technique may be used for dedicated appliance like computer systems (e.g. Automated teller Machines (ATMs), television set-top boxes, Voice over Internet Protocol (VoIP) conversion device, etc.). In other embodiments, this technique may be used to provide one of a number of boot images to various computer systems within the network of a (or related) business entities. However, these are merely a few illustrative embodiments to which the disclosed subject matter is not limited.

FIG. 1 is a flowchart illustrating an embodiment of a technique for starting (or restarting) a computer system in accordance with the claimed subject matter. Block 105 illustrates that, in one embodiment, the computer system may be started and basic initialization and/or configuration may occur. In some embodiments, this may include rebooting or restarting the system. In one embodiment, this may include the type of basic hardware initialization performed by a Basic Input-Output System (BIOS) firmware. In another embodiment, this may include a UEFI initialization. However, these are merely two illustrative embodiments and other embodiments of the disclosed subject matter are contemplated.

Block 110 illustrates that, in one embodiment, the computer system may attempt to verify the credentials supplied to the computer system during the basic initialization and/or configuration. In one embodiment, the credentials may be embedded within the firmware. In another embodiment, the credentials may en encoded with in the hardware, such as, for example via a dongle. In one embodiment the verification may entail a form of Trusted Computing. In this context, Trusted Computing (TC) is a technology substantially complaint or derived from a technology that is promoted by the Trusted Computing Group (TCG). In one embodiment, the credentials may not be verified as correct, but merely existing. In this embodiment, another system, such as for example, the boot image server or a Keberos server may verify the credentials correctness or privileges.

Block 115 illustrates that, in one embodiment, if the credentials are not present or verified, they may be entered via an alternate technique. In one embodiment, the technique may involve prompting a user for the credentials. In various embodiments, they credentials may be supplied via a keyboard, biometric device, or a flash memory (i.e. pen drive).

Block 120 illustrates that, in one embodiment, a determination may be made as to whether or not an operating system is installed locally. In one embodiment, the boot image may be installed on a local media, such as, for example, a hard drive, optical storage (e.g. CD-ROM, DVD-ROM, etc.), a flash memory (e.g. a pen drive), a floppy drive, etc. In the illustrated embodiment of FIG. 1 a preference for a locally installed operating system is shown; however other preference schemes are contemplated and may even be configurable. In one embodiment, the operating system may include a virtual machine monitor or hypervisor.

Block 125 in combination with Block 130 illustrates that, in one embedment, if a local boot image exists, it may be used to boot the computer system. In one embodiment, if the local boot image unsuccessfully executes, the computer system may revert to Block 140 (error handling) or Block 135 (booting utilizing a messaging protocol).

Block 135 illustrates that, in one embodiment, if a local boot image is not present, a determination may be made as to whether or not the computer system supports the loading of a boot image over a network via a messaging protocol, such as, for example, email. In one embodiment, this determination may include determining if all the necessary information needed to reach the boot image server has been properly configured. In another embodiment, the determination may merely involve whether or not the hardware and/or firmware supports this feature.

Block 140 illustrates that, in one embodiment, if an error has occurred while attempting to load a boot image, an error and/or recovery process may be initiated. In one embodiment, this may mean merely informing the user of an error and stopping further processing. In another embodiment, a more complex recovery or error reporting scheme may be involved. In one be variation of such an embodiment, a report may be transmitted to a supervisor or network monitor.

Block 145 illustrates that, in one embodiment, the computer system may initiate a DHCP request. In another embodiment, the computer system may have a static IP address. In another embodiment, the system may establish itself on the network via other methods. In one embodiment, the system may also establish itself on a wireless or a secured network.

Block 150 illustrates that, in one embodiment, a determination may be made as to whether or not the DHCP request was successful. In one embodiment, this may be a determination as to whether or not the computing system was properly established on a network. If the computer system was not properly established on a network, an error procedure may be used, as illustrated by Block 140.

Block 155 illustrates that, in one embodiment, once the computer system has been established on the network a discovery request may be made to locate a boot image (or sector). In one embodiment, this may include making a broadcast request for any boot image servers on the network. In this context, a boot image server may be a server capable of providing or attempting to provide a firmware to a computer system via a network connection. In another embodiment, the computer system may make a specific (i.e. non-broadcast) request to a known or expected boot image server. In a specific embodiment, an established hostname may be provided to the computer system during initial system configuration. This hostname may be combined with the domain name provided during the DHCP phase. This fully qualified domain name be expected to be the name of the domain's boot image server. However, this is merely one specific embodiment, and other embodiments are well within the scope of the disclosed subject matter. In one embodiment, a determination may be made as to the success of this discovery request and, if the request is not sufficiently successful and error handling procedure may be used (as illustrated by Block 140).

Block 160 illustrates that, in one embodiment, an email request (or other messaging request) may be sent to the boot image server to provide a boot image to the computer system. In one embodiment, this request may include information to facilitate the selection of a particular boot image. In one embodiment, the information may include details of the computer system, such as for example, the hardware used by the system, the location of the system, the purpose of the system, or the credentials (which in one embodiment may be used to identical or categorize the user) of the system. In one embodiment, the boot image server may include an email server. As previously stated, while this document may refer to the use of email as a shorthand, it is understood that this is merely one embodiment of the disclosed subject matter and any messaging protocol may be used, such as for example am Instant Messaging (IM) or Short Message Service (SMS) protocol may be used, and is contemplated. In one embodiment, a determination may be made as to the success of this email request and, if the request is not sufficiently successful and error handling procedure may be used (as illustrated by Block 140). In one embodiment, the actions of Block 155 (boot image server discovery) and Block 160 (email request) may be combined into a single action or set of actions. Of course, all illustrated actions in the embodiment illustrated by FIG. 1 may be combined, omitted, rearranged, or added to in other embodiments of the disclosed subject matter.

Block 165 illustrates that, in one embodiment, the computer system may receive a message or series of messages comprising the boot image. In one embodiment, the boot image server may transmit a monolithic boot image to computer system. In another embodiment, the boot image server may transmit the boot image via a series of messages. In one embodiment, the boot image may be pushed to the computer system. For example, in a specific embodiment, the boot image server may act as a mail user agent (MUA) and the computer system may act as a mail submission agent (MSA) or mail delivery agent (MDA), for example via protocols such as SMTP. In one embodiment, the boot image may be pulled from the boot image server. For example, in a specific embodiment, the boot image server may act as mail user agent (MUA) and the boot image server may act as a mail delivery agent (MDA), for example via protocols such as POP3 or IMAP.

Block 170 illustrates that in one embodiment, the computer system may attempt to authentic the received message. In one embodiment, the message itself may be authenticated. In one embodiment, the boot image may be authenticated. In one embodiment, the authentication may merely involve a checksum. In another embodiment, the authentication may to only include a check against corruption of the message or image, but also the credentials of the sender of the message or image. In one embodiment, if a multi-part message has been sent each part may be separately verified. In another embodiment, the message as a whole may be authenticated. In one embodiment, a determination may be made as to the success of this authentication and, if the authentication is not sufficiently successful and error handling procedure may be used (as illustrated by Block 140).

Block 130 illustrates that, in one embodiment, once the boot image has been successfully received and authenticated, the boot image may be executed.

Figure 2:
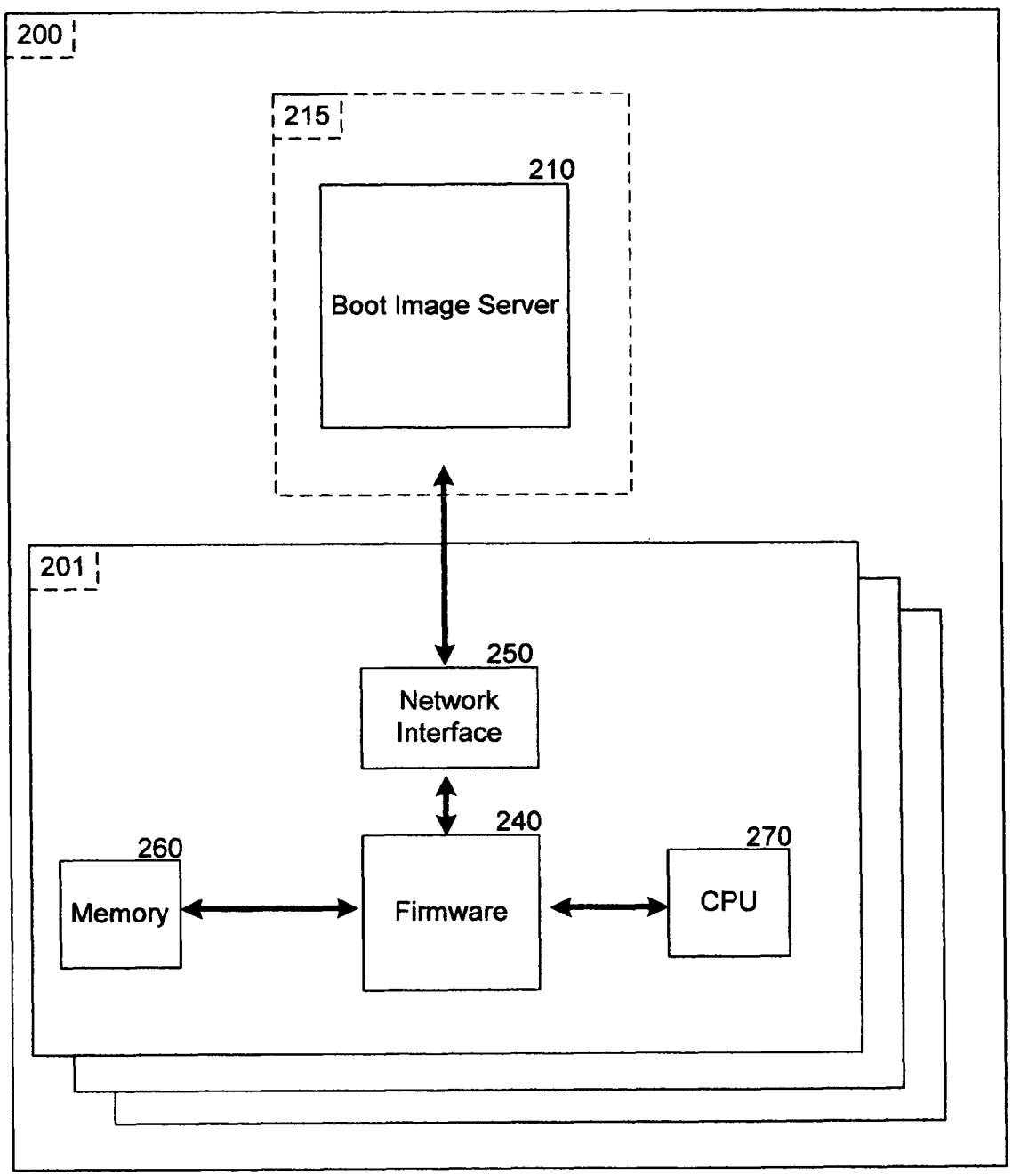
FIG. 2 is a block diagram illustrating an embodiment of a system and apparatus for starting (or restarting) a computer system in accordance with the claimed subject matter.

FIG. 2 is a block diagram illustrating an embodiment of a system 200 and apparatus 201 for starting (or restarting) a computer system in accordance with the claimed subject matter. In one embodiment, the system may include a device executing a boot image server 210 and an apparatus 201. In one embodiment of the system a plurality of apparatuses or computing systems may be included. In one embodiment, the various apparatuses may be non-identical (i.e. heterogeneous).

The apparatus 201 may include, in one embodiment, a network interface 250 capable of facilitating communication with a boot image server 210, a memory 260 capable or storing at least a portion of a boot image, a firmware 240 capable of attempting to load a boot image utilizing a network messaging protocol (such as, for example, email, IM, SMS, etc.), and a central processing unit (CPU) 270 capable of executing a firmware. In one embodiment, the firmware 240 may also be capable of performing a technique as described above and illustrated, in one specific embodiment, by FIG. 1.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The following is claimed:

1. A method of booting a computer system comprising:
   establishing, by the computer system, a connection to a network;
   discovering, by the computer system, a boot image server on the network;
   requesting, by the computer system, at least part of a boot image from the boot image server, via a message;
   receiving, by the computer system, at least part of the boot image via a message communication over the network, the message communication utilizing a messaging protocol selected from the group of messaging protocols including an instant messaging protocol and an email protocol, that is not blocked by routers or firewalls when the message protocol is used to transmit message communication containing portions of the boot image; and
   using the boot image, by the computer system, to boot the computer system.

2. The method of claim 1, further including:
   determining, by the computer system, that another boot image is not locally available before performing said establishing, discovering, requesting, receiving, and using.

3. The method of claim 2, wherein the boot image is constructed from a first portion of the boot image which is locally available, and a second portion of the boot image which is received, at least in part, via said received message communication.

4. The method of claim 1, wherein said discovering, by the computer system, a boot image server and said requesting, by the computer system, at least part of a boot image from the boot image server include:
   sending, by the computer system, a message to the boot image server, wherein the message to the boot image server requests at least part of the boot image.

5. The method of claim 4, wherein said sending, by the computer system, a message to the boot image server includes sending, by the computer system, a message to the boot image server that includes information about the computer system, the information being usable to facilitate selection by the boot image server of the boot image from a plurality of possible boot images.

6. The method of claim 1, wherein
   said establishing, by the computer system, a connection to a network includes utilizing a Dynamic Host Configuration Protocol (DHCP);
   said discovering, by the computer system, a boot image server includes transmitting a broadcast discovery request;
   said requesting, by the computer system, at least part of a boot image from the boot image server includes sending an email request; and
   said receiving, by the computer system, at least part of the boot image via a message communication that utilizes a messaging protocol includes utilizing a Simple Mail Transfer Protocol (SMTP) that is not blocked by routers or firewalls when the message protocol is used to transmit message communication containing portions of the boot image.

7. An apparatus comprising:
   a network interface, configured to facilitate communication with a boot image server;
   a processor, configured to execute firmware; and
   the firmware, configured to enable the apparatus, in response to execution of the firmware, to:
      establish for the apparatus a connection to a network;
      discover a boot image server on the network;
      request at least part of a boot image from the boot image server;
      receive at least part of the boot image via a message communication over the network, the message communication utilizing a messaging protocol selected from the group of messaging protocols including an instant messaging protocol and an email protocol, that is not blocked by routers or firewalls when the message protocol is used to transmit message communication containing portions of the boot image; and
      use the boot image to boot the apparatus.

8. The apparatus of claim 7, wherein the firmware is further configured to enable the apparatus, in response to execution of the firmware, to:
   determine that another boot image is not locally available before performing said establish, discover, request, receive, and use.

9. The apparatus of claim 8, wherein the firmware is configured to enable the apparatus, in response to execution of the firmware, to construct the boot image from a first portion of the boot image which is locally available and a second portion of the boot image which is received, at least in part, via said message communication.

10. The apparatus of claim 7, wherein the firmware is further configured to enable the apparatus, in response to execution of the firmware, to discover a boot image server and to request at least part of a boot image from the boot image server by enabling the apparatus to send a message to the boot image server, wherein the message to the boot image server requests at least part of the boot image.

11. The apparatus of claim 10, wherein the firmware is configured to enable the apparatus, in response to execution of the firmware, to send the message to the boot image server, wherein the sent message includes information about the apparatus for selection by the boot image server of the boot image from a plurality of possible boot images.

12. The apparatus of claim 7, wherein the firmware is configured to enable the apparatus, in response to execution of the firmware, to
   establish the apparatus on a network by utilizing a Dynamic Host Configuration Protocol (DHCP);
   discover a boot image server by transmitting a broadcast discovery request;
   request at least part of a boot image from the boot image server by sending an email request; and
   receive at least part of the boot image via a message communication, wherein the message communication utilizes a Simple Mail Transfer Protocol (SMTP), that is not blocked by routers or firewalls when the message protocol is used to transmit message communication containing portions of the boot image.

13. A system comprising:
   a computer device configured to receive at least part of a boot image, from a boot image server, via a message communication over a network, the message communication utilizing a messaging protocol selected from the group of messaging protocols including an instant messaging protocol and an email protocol, that is not blocked by routers or firewalls when the message protocol is used to transmit message communication containing portions of the boot image; and the computer device further configured to use the boot image to boot the apparatus; and the boot image server configured to select and provide said at least part of the boot image to the computer device via said message communication.

14. The system of claim 13, wherein the boot image server is further configured to select and provide said at least part of the boot image to a plurality of other computer devices.

15. The system of claim 13, wherein the boot image server is further configured to authenticate the computer device.

16. An article of manufacture comprising:
a non-transitory tangible machine accessible storage medium having stored thereon a plurality of machine executable instructions, wherein the instructions are configured to cause a computer system, in response to execution of the instructions by the computer system to perform operations comprising:
establishing for the computer system a connection to a network;
discovering a boot image server on the network;
requesting at least part of a boot image from the boot image server;
receiving at least part of the boot image via a message communication over the network, the message communication utilizing a messaging protocol selected from the group of messaging protocols including an instant messaging protocol and an email protocol, that is not blocked by routers or firewalls when the message protocol is used to transmit message communication containing portions of the boot image; and
using the boot image to boot the computer system.

17. The article of manufacture of claim 16, wherein the operations further comprise:

determining that the boot image is not locally available before performing said establishing, discovering, requesting, receiving, and using operations.

18. The article of manufacture of claim 17, wherein the operations further comprises:
constructing the boot image from a first portion of the boot image, which is locally available, and a second portion of the boot image, which is received, at least in part, via said message communication.

19. The article of manufacture of claim 16, wherein said discovering a boot image server and said requesting at least part of a boot image from the boot image server comprises sending a message to the boot image server, wherein the message to the boot image server requests at least part of the boot image.

20. The article of manufacture of claim 19, wherein said sending a message to the boot image server comprises including within the message information about the computer system for selection by the boot image server of the boot image from a plurality of possible boot images.

21. The article of manufacture of claim 16, wherein
said establishing for the computer system for a connection to a network includes utilizing a Dynamic Host Configuration Protocol (DHCP);
said discovering a boot image server includes transmitting a broadcast discovery request;
said requesting at least part of a boot image from the boot image server includes sending an email request; and
said receiving at least part of the boot image via a message communication includes utilizing a Simple Mail Transfer Protocol (SMTP), that is not blocked by routers or firewalls when the message protocol is used to transmit message communication containing portions of the boot image.

* * * * *